United States Patent Office 3,504,505
Patented Apr. 7, 1970

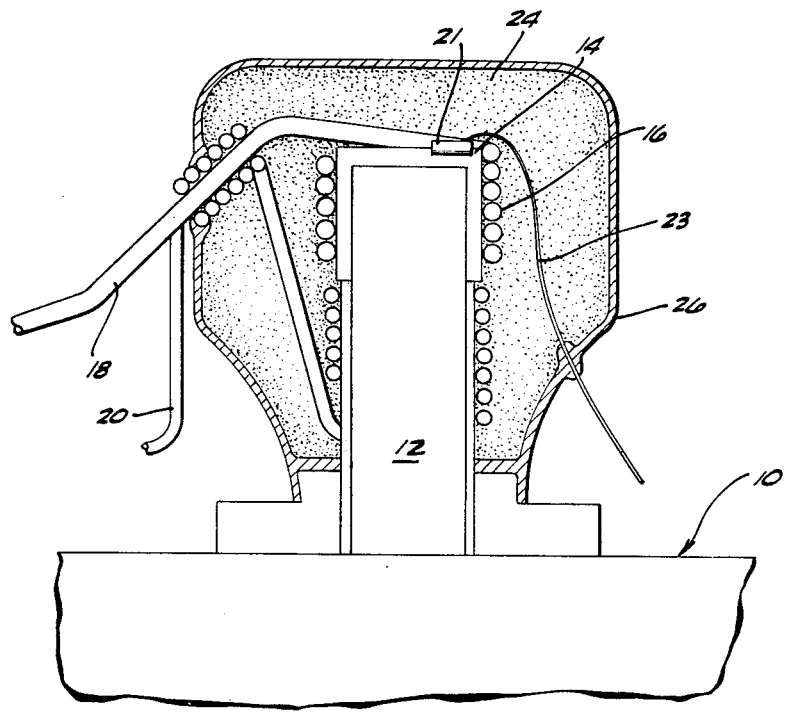

3,504,505
INSULATED CRYOGENIC REFRIGERATOR COLD HEAD
Henry D. Aske, Palos Verdes, and Stanley E. Spencer, Torrance, Calif., assignors to Hughes Aircraft Company, Culver City, Calif., a corporation of Delaware
Filed Feb. 6, 1968, Ser. No. 707,913
Int. Cl. F25b 9/00; F25d 23/08
U.S. Cl. 62—6                                    2 Claims

ABSTRACT OF THE DISCLOSURE

The structure disclosed provides encapsulation of a cryogenic refrigerator cold head and segments of the associated transfer lines in rigid polyurethane foam. The foam acts as a primary insulator for the cold head. The foam is covered with a layer or coating of silicone rubber which maintains the physical integrity of the foam, seals the foam completely from ambient atmosphere, provides mechanical protection for the entire arrangement.

---

The invention herein described was made in the course of or under a contract with the Navy. The invention is directed to cryogenic refrigerator cold head having a novel combination of polyurethane rigid foam and a covering coating of silicone rubber to insulate and completely seal the arrangement from ambient atmosphere.

Many service applications, for example electromagnetic radiation detector cooling, require an extremely low temperature detector environment. The temperatures required are in the cryogenic range and frequently approach absolute zero. Refrigerators using the thermodynamic cycles of cryogenic gases such as helium or hydrogen have been produced to create the cryogenic temperature environments. To efficiently maintain the extremely low temperatures, proper insulation of the cold head of such refrigerators is a practical necessity. Effective insulation has been achieved, in prior art arrangements, by the use of Dewar type containers surrounding the refrigerator cold head. The container is gas evacuated to provide a vacuum environment, thus limiting conductive heat transfer from the cold head of the refrigerator. Dewar type insulation structures are very expensive to manufacture. Additionally they have been found particularly susceptible to degradation, that is loss of vacuum, as a result of vibration, shock and the like when operated under field conditions. Without effective insulation, therefore, the ability of the refrigerator to produce the required cryogenic temperatures needed for the detector environment is seriously impaired.

With the above in mind, it is a primary object of the invention to provide a durable, efficient, easily repairable insulation arrangement for the cold head of cryogenic refrigerator.

It is a further object of the invention to provide an insulation arrangement of the type described which effectively insulates at cryogenic temperature levels and affords proper physical protection under field conditions against damage as resulting from vibration, mechanical shock and varying climatic conditions.

It is a particular object of the invention to provide a cold head of the cryogenic refrigerator with an insulation arrangement that comprises low density polyurethane foam encapsulating the refrigerator cold head and silicone rubber coating covering the foam to maintain this physical integrity of the foam and seal the insulating material from ambient conditions.

That and other objects and features of the invention will become apparent in the course of the following description and from an examination of the related drawings wherein:

The single figure is a central vertical sectional view, partially in elevation, of a presently preferred cryogenic refrigerator cold head and insulation arrangement.

Directing attention to the figure the cryogenic refrigerator is indicated generally at 10 and includes an upstanding cold cylinder 12. As will be understood by those skilled in this art, the cold cylinder 12 is a cylinder piston arrangement having an expansion chamber (not shown) therein which produces extremely low temperatures resulting from the expansion of a cycling refrigerant such as helium or hydrogen gas. The cylinder 12 is provided with a cold head 14, said head being surrounded by a coil 16. The coil 16 communicates with a fluid entrance pipe 18 and an exit pipe 20. The exit pipe 20 has a plurality of coils 22 surrounding the entrance pipe 18 to pre-cool refrigerant gas before conductive heat transfer contact with the cold head 14. The gas in the coil 16 is generally independent of the refrigerant cycling in the cylinder 12. A gas in the coil 16 is cooled at the cold head 14 to complete or partial liquefaction and is delivered via exit pipe 20 to a heat load such as an electromagnetic radiation detector. A temperature sensing thermistor 21 and electrical lead 23 are also provided.

As earlier noted, the extreme low cryogenic temperatures produced at the cold head 14 requires highly effective insulation to maintain refrigerator efficiency. In prior art arrangements the described Dewar type containers were used to accomplish this function.

The present invention provides for the encapsulation of the cylinder 12, the coil 16, coil 22, and segments of pipes 18 and 20 in a volume of low density polyurethane foam indicated at 24. The foam 24 may surround the cylinder 12 in any desired configuration providing it is sufficiently thick to effectively insulate. The applied foam is then covered or coated with a layer of rubber material 26 which completely seals the foam from ambient atmosphere. The rubber 26 also provides mechanical protection for the foam against damage due to mechanical shock or vibration. The seal must be complete. Air in the foam adjacent the cold head 14 would liquefy while the refrigerator was operating and could sublimate rapidly i.e., flash, to its gaseous condition when the refrigerator is turned off and warmed which would result in damage to the foam insulation.

In constructing the arrangement described, a mold (not shown) may be provided having the configuration desired for the foam 24. The mold is initially cleaned of all possible contaminants such as dirt, old foam deposits or the like. The mold surface may then be coated with mold release material commonly known as type S 122. The cold head of the refrigerator is then deposited in the mold and polyurethane foam is mixed and injected into the mold cavity to completely surround the cylinder 12 as shown in the drawing. A suggested foam is that known commercially as CPR 302. The mold release suggested is a commercial product of the Millar-Stephenson Chemical Company. The foam is produced by CPR Corp., a division of The Upjohn Company. After complete foam injection, the arrangement is cured for 2 hours at a temperature of 200–210° F. After curing the cylinder 12, now encapsulated in the foam 24, is removed from the curing environment.

The application of a protective coating to the foam is the next step in the process of providing the insulation arrangement.

The foam and cylinder assembly to be coated is first cleaned completely by wiping the surface thereof with tissues soaked in methl-ethyl-ketone which in turn is followed by a second cleaning with tissues soaked in trichlorethylene. After complete cleansing, the arrangement is dried in an oven at approximately 140° F. for a period of approximately 10 minutes.

After cleaning and drying the surface of the foam and any metallic parts not covered by the foam to which the coating is to adhere are lightly abraded with 260 grit sandpaper. The loose particles resulting are blown from the assembly with clean, dry air. After abrading, a second cleansing operation as described above is undertaken.

A suggested coating found to be satisfactory is silicone rubber known commercially as RTV 630 Part A combined with a curing agent known as RTV 630 Part B. The materials noted are mixed in a ratio by weight of approximately 100 to 7 creating a plastic mass of coating material. It is desirable to place the mass of coating material in a vacuum chamber and repeatedly evacuate and pressurize the chamber for a period of approximately 20 minutes to remove entrapped air. As the pressure in the vacuum chamber is raised and lowered several times during this period, air bubble formation in the mass breaks down.

The cylinder-foam assembly is then carefully masked leaving exposed only those areas to be coated. A thin film of primer, known commercially as SS 4155, is applied to all surfaces to be coated and allowed to dry at room temperature for about one hour to improve coating adhesion. The rubber curing agent and primer suggested are commercial products of the General Electric Company, Silicone Product Division.

The plastic rubber mass is then manually applied to all primed surfaces until the desired thickness thereof is obtained over the entire area. The entire assembly is then placed in a vacuum chamber and the pressure raised and lowered several times for a period of about 4 minutes to assure destruction of any air bubble formation that may become entrapped in the coating during application. The assembly is then removed from the vacuum chamber and the surface of the rubber smoothed to assure all holes are covered and a completely integrated coat is provided. Curing is accomplished by placing the assembly in an oven at a temperature of approximately 170° F. for a period of about 12 hours.

The arrangement described and the procedure of manufacture has been found to produce an extremely effective insulation arrangement for the cold heads of cryogenic refrigerators. A gas impenetrable semi-resilient coating and effective insulation meets the severe environmental service conditions characterized, for example, by wide variations in temperature and climatic conditions as well as mechanical shock, vibration and rough treatment.

The invention as shown is by way of illustration and not limitation and may be subject to various modifications within the spirit or scope thereof.

What is claimed is:

1. In a cryogenic refrigerator including an expansion cylinder providing the locale for the production of cryogenic temperatures,
    said cylinder comprising a projecting cold head,
    coil means surrounding the cold head and in thermally conductive contact therewith whereby the cryogenic temperatures created in the cold head may be communicated to the coil means,
    insulating means encapsulating the cold head and the coil means to completely seal the coil means and cold head from ambient environmental condition thereby preventing contact between ambient atmosphere and the cold head and coil means,
    said insulating means comprising a polyurethane foam surrounding the cold head and coil means and including a rubber-like coating material completely encapsulating the insulating means, and
    entrance and exit pipes penetrating the coating material and insulating means and communicating with the coil means.

2. A cryogenic refrigerator according to claim 1, wherein said rubber-like material is silicon rubber.

References Cited

UNITED STATES PATENTS

| 2,750,765 | 6/1956 | Kohler et al. | 62—6 |
| 3,147,600 | 9/1964 | Malaker et al. | 62—6 |
| 3,188,822 | 6/1965 | Daunt | 62—6 |
| 3,341,050 | 9/1967 | Forman et al. | 220—9 |
| 3,357,585 | 12/1967 | Morrison | 220—9 |

SAMUEL W. ENGLE, Primary Examiner

U.S. Cl. X.R.

62—6